US008607353B2

(12) United States Patent (10) Patent No.: US 8,607,353 B2
Rippert, Jr. et al. (45) Date of Patent: Dec. 10, 2013

(54) SYSTEM AND METHOD FOR PERFORMING THREAT ASSESSMENTS USING SITUATIONAL AWARENESS

(75) Inventors: Donald J. Rippert, Jr., Great Falls, VA (US); Walid Negm, Finksburg, MD (US); Taminder S. Chahal, Hoffman Estates, IL (US); Christopher P. Checco, Oakton, VA (US)

(73) Assignee: Accenture Global Services GmbH (CH)

( * ) Notice: Subject to any disclaimer, the term of this patent is extended or adjusted under 35 U.S.C. 154(b) by 248 days.

(21) Appl. No.: 13/041,121

(22) Filed: Mar. 4, 2011

(65) Prior Publication Data

US 2012/0030767 A1 Feb. 2, 2012

Related U.S. Application Data

(63) Continuation-in-part of application No. 12/805,406, filed on Jul. 29, 2010.

(51) Int. Cl.
*G06F 11/00* (2006.01)
(52) U.S. Cl.
USPC ............... 726/25; 709/203; 709/225; 705/53
(58) Field of Classification Search
USPC .................. 726/25; 709/225, 203; 705/53
See application file for complete search history.

(56) References Cited

U.S. PATENT DOCUMENTS

| 6,735,630 | B1* | 5/2004 | Gelvin et al. | 709/224 |
|---|---|---|---|---|
| 6,760,420 | B2* | 7/2004 | Heilmann et al. | 379/189 |
| 6,826,607 | B1* | 11/2004 | Gelvin et al. | 709/224 |
| 6,832,251 | B1* | 12/2004 | Gelvin et al. | 709/224 |
| 6,859,831 | B1* | 2/2005 | Gelvin et al. | 709/224 |
| 6,917,902 | B2* | 7/2005 | Alexander | 702/189 |
| 7,020,701 | B1* | 3/2006 | Gelvin et al. | 709/224 |
| 7,212,113 | B2* | 5/2007 | Zanovitch | 340/540 |
| 7,440,558 | B2* | 10/2008 | Heilmann et al. | 379/189 |
| 7,454,499 | B2* | 11/2008 | Cantrell et al. | 709/225 |
| 7,609,159 | B2* | 10/2009 | Benson et al. | 340/540 |
| 7,656,286 | B2* | 2/2010 | Benson et al. | 340/508 |
| 7,788,203 | B2* | 8/2010 | Friedlander et al. | 706/47 |

(Continued)

OTHER PUBLICATIONS

Zhu, Ying; Attack Pattern Discovery in Forensic Investigation of Network Attacks; Selected Areas in Communications, IEEE Journal on (0733-8716);2011. vol. 29,Iss.7;p. 1349-1357.*

(Continued)

*Primary Examiner* — Luu Pham
*Assistant Examiner* — Angela Holmes
(74) *Attorney, Agent, or Firm* — Finnegan, Henderson, Farabow, Garrett Dunner, LLP

(57) ABSTRACT

Systems, methods, and computer program products are provided for performing threat assessments. In one exemplary embodiment, the method may include generating one or more patterns of behavior corresponding to a security breach at a first company, and storing the generated one or more patterns in a pattern repository. In addition, the method may include comparing at least one of the one or more patterns with one or more standardized log files for the first company to identify one or more first log entries related to the behavior corresponding to the security breach. The method may also include processing at least one pattern of the one or more patterns with one or more standardized log files for a second company to identify log entries of the second company that indicate a possible security breach at the second company.

21 Claims, 15 Drawing Sheets

(56) References Cited

U.S. PATENT DOCUMENTS

| | | | |
|---|---|---|---|
| 7,797,367 B1* | 9/2010 | Gelvin et al. | 709/200 |
| 7,818,249 B2* | 10/2010 | Lovejoy et al. | 705/38 |
| 7,844,687 B1* | 11/2010 | Gelvin et al. | 709/220 |
| 7,895,452 B2* | 2/2011 | Mir et al. | 713/193 |
| 7,934,103 B2* | 4/2011 | Kidron | 713/188 |
| 8,032,939 B2* | 10/2011 | Palnitkar et al. | 726/25 |
| 8,103,601 B2* | 1/2012 | Hnatio | 706/14 |
| 8,140,658 B1* | 3/2012 | Gelvin et al. | 709/224 |
| 8,305,447 B1* | 11/2012 | Wong | 348/151 |
| 8,314,732 B2* | 11/2012 | Oswald et al. | 342/90 |
| 8,321,938 B2* | 11/2012 | Strayer et al. | 726/23 |
| 2002/0021791 A1* | 2/2002 | Heilmann et al. | 379/189 |
| 2002/0138416 A1* | 9/2002 | Lovejoy et al. | 705/38 |
| 2003/0053658 A1* | 3/2003 | Pavlidis | 382/103 |
| 2003/0053659 A1* | 3/2003 | Pavlidis et al. | 382/103 |
| 2003/0123703 A1* | 7/2003 | Pavlidis et al. | 382/103 |
| 2003/0167153 A1* | 9/2003 | Alexander | 702/189 |
| 2003/0200464 A1* | 10/2003 | Kidron | 713/201 |
| 2003/0233278 A1* | 12/2003 | Marshall | 705/14 |
| 2004/0093513 A1* | 5/2004 | Cantrell et al. | 713/201 |
| 2004/0234056 A1* | 11/2004 | Heilmann et al. | 379/196 |
| 2005/0248450 A1* | 11/2005 | Zanovitch | 340/506 |
| 2005/0251397 A1* | 11/2005 | Zanovitch et al. | 705/1 |
| 2005/0251398 A1* | 11/2005 | Zanovitch et al. | 705/1 |
| 2006/0041505 A1* | 2/2006 | Enyart | 705/40 |
| 2006/0291657 A1* | 12/2006 | Benson et al. | 380/270 |
| 2007/0002139 A1* | 1/2007 | Benson et al. | 348/143 |
| 2007/0002140 A1* | 1/2007 | Benson et al. | 348/143 |
| 2007/0008410 A1* | 1/2007 | Benson et al. | 348/143 |
| 2007/0030143 A1* | 2/2007 | Benson et al. | 340/508 |
| 2007/0182544 A1* | 8/2007 | Benson et al. | 340/521 |
| 2007/0225995 A1* | 9/2007 | Moore | 705/1 |
| 2008/0077474 A1* | 3/2008 | Dumas et al. | 705/10 |
| 2008/0106405 A1* | 5/2008 | Zanovitch | 340/540 |
| 2008/0320552 A1* | 12/2008 | Kumar et al. | 726/1 |
| 2009/0013194 A1* | 1/2009 | Mir et al. | 713/193 |
| 2009/0076879 A1* | 3/2009 | Sparks et al. | 705/9 |
| 2009/0076969 A1* | 3/2009 | Sparks | 705/80 |
| 2009/0119741 A1* | 5/2009 | Palnitkar et al. | 726/1 |
| 2009/0119776 A1* | 5/2009 | Palnitkar et al. | 726/25 |
| 2009/0271504 A1* | 10/2009 | Ginter et al. | 709/220 |
| 2010/0037311 A1* | 2/2010 | He et al. | 726/15 |
| 2010/0064133 A1* | 3/2010 | Martin et al. | 713/154 |
| 2010/0090822 A1* | 4/2010 | Benson et al. | 340/508 |
| 2010/0100930 A1* | 4/2010 | King | 726/1 |
| 2010/0109938 A1* | 5/2010 | Oswald et al. | 342/90 |
| 2010/0148940 A1* | 6/2010 | Gelvin et al. | 340/286.02 |
| 2010/0201516 A1* | 8/2010 | Gelvin et al. | 340/539.26 |
| 2010/0202299 A1* | 8/2010 | Strayer et al. | 370/252 |
| 2010/0241501 A1* | 9/2010 | Marshall | 705/14.13 |
| 2010/0250497 A1* | 9/2010 | Redlich et al. | 707/661 |
| 2010/0299292 A1* | 11/2010 | Collazo | 706/14 |
| 2011/0173146 A1* | 7/2011 | Hnatio | 706/14 |

OTHER PUBLICATIONS

Chunyue, Zhou; A Pattern matching based Network Intrusion Detection System; Control, Automation, Robotics and Vision, 2006. ICARCV '06. 9th International Conference on (1-4244-0341-3);2006. p. 1-4.*

Lankewicz, L.;Real-time anomaly detection using a nonparametric pattern recognition approach; Computer Security Applications Conference, 1991. Proceedings., Seventh Annual (0-8186-2280-6); 1991. p. 80-89.*

* cited by examiner

SYSTEM AND METHOD FOR PERFORMING THREAT ASSESSMENTS USING SITUATIONAL AWARENESS

PRIORITY

This application is a continuation-in-part of U.S. patent application Ser. No. 12/805,406, filed Jul. 29, 2010, entitled "SYSTEM AND METHOD FOR RISK-BASED DATA ASSESSMENT," by Christopher P. Checco and Benjamin Anthony Slater, which is incorporated by reference herein in its entirety for any purpose.

RELATED APPLICATIONS

This application is related to, and incorporates by reference in their entireties, U.S. patent application Ser. No. 12/950,251, filed Nov. 19, 2010, entitled "SYSTEMS AND METHODS FOR DETECTING AND INVESTIGATING INSIDER FRAUD," by Jeffrey M. Margolies, Keith Gregory Lippiatt, and Joseph Eric Krull, and U.S. Provisional Application No. 61/313,094, filed Mar. 11, 2010, entitled "DETECTING AND INVESTIGATING INSIDER FRAUD, by Jeffrey M. Margolies, Keith Gregory Lippiatt, and Joseph Eric Krull.

TECHNICAL FIELD

The present disclosure generally relates to a system and method for performing threat assessments and, more particularly, to a system and method for performing threat assessments by identifying patterns of actions or series of actions that may lead to a security breach.

BACKGROUND

There are a number of types of threats that may pose a concern for a business or other entity. These threat types may include external or cyber threats, insider threats, etc. Each of these threat types may be amenable to threat modeling, i.e., a description of a set of actions or series of actions that may pose a risk for the business or other entity. External or cyber threats may pose a risk to a business or other entity through the theft of assets, loss or destruction of assets, disclosure of data, etc. External threats may include, for example, infiltration by hackers or unauthorized users who subvert security systems, malware, spyware, espionage, etc. For example, end users' information (i.e., trade secrets, customer data, personal data, product plans, marketing plans, financial data, and the like) may be stolen, changed, or deleted through connection/session hijacking, spoofing, eavesdropping, etc. Computing assets (i.e., memory, ports, servers, and the like) may be destroyed, infected, or blocked using, for example, spam, denial of service, worms, viruses, etc.

Insider fraud occurs when an enterprise insider, e.g., an employee of a given enterprise or company, abuses his or her access to enterprise resources and takes actions that harm the enterprise, enrich the enterprise insider, or both. Enterprise insiders often are "trusted" users who need access to sensitive information and sensitive company resources in order to perform their jobs.

Insider fraud can be either intentional or unintentional; some insiders are maliciously trying to commit fraud, while others simply do not understand security rules or make mistakes. Examples of insider fraud include stealing trade secrets, embezzling money, stealing customer identities, disclosing customer information, and engaging in risky trading in the name of the enterprise.

Enterprises face significant risk from the intentional and unintentional actions of insiders. Incidents caused by insiders can have a devastating impact on an enterprise. However, most security solutions focus primarily on external threats; not on threats posed by enterprise insiders. While some technologies are designed to detect and combat internal fraud, these technologies generally provide a patchwork of features without fundamentally managing risk. For example, data loss prevention (DLP) tools attempt to stop external leakage of specific sensitive data. These DLP tools analyze outgoing data to identify specific patterns corresponding to, for example, social security numbers or credit card numbers. However, these DLP tools have a limited context for detecting and blocking complex data types and can often be defeated by simple evasive tricks. As another example, content filtering solutions block specific types of suspicious activities such as file transfers, use of personal webmail accounts, and downloading of unauthorized software. However, these filtering solutions are not comprehensive. Identity and access management (IAM) tools provide tools to allow granular control of user access to systems, but cannot easily identify malicious activity by authorized users. Password management and auditing tools can detect compromised passwords, but have few abilities beyond that limited functionality. Database activity and monitoring tools monitor user access to databases but are difficult to tune and require specialized expertise to determine what is malicious. Physical security systems can detect access violation attempts, but have limited analytical functions. Other security technologies such as encryption, USB device blocking, and security event monitoring provide protection from specific threats, but do not provide more general protection.

As another example, security information and event management (SIEM) systems can detect certain types of suspicious behavior, but have to be carefully configured to avoid false positives. Network access control systems can detect and block enterprise insiders that want to launch malware within an enterprise before the insider accesses the network, but once the user is authenticated and on the network, they have little effect. Fraud detection systems can detect some fraud but require complex integration and tuning, and often do not integrate well with traditional security systems.

The disclosed embodiments are configured to overcome these and other problems.

SUMMARY

In accordance with the present disclosure, as embodied and broadly described herein, a method of identifying patterns of actions for performing threat assessments by identifying patterns of behavior, comprises: generating one or more patterns of behavior corresponding to a security breach at a first company; storing the generated one or more patterns in a pattern repository; comparing at least one of the one or more patterns with one or more standardized log files for the first company to identify one or more first log entries related to the behavior corresponding to the security breach; and processing at least one pattern of the one or more patterns with one or more standardized log files for a second company to identify log entries of the second company that indicate a possible security breach at the second company.

In accordance with the present disclosure, as embodied and broadly described herein, a computer-readable recording medium storing a computer-executable program which, when executed by a processor, performs a method for performing threat assessments by identifying patterns of behavior, comprises: generating one or more patterns of behavior corresponding to a security breach at a first company; storing the generated one or more patterns in a pattern repository; comparing at least one of the one or more patterns with one or more standardized log files for the first company to identify one or more first log entries related to the behavior corresponding to the security breach; and processing at least one pattern of the one or more patterns with one or more standardized log files for a second company to identify log entries of the second company that indicate a possible security breach at the second company.

In accordance with the present disclosure, as embodied and broadly described herein, a system of identifying patterns of actions for performing threat assessments by identifying patterns of behavior, the system comprises: at least one memory to store data and instructions; and at least one processor configured to access the at least one memory and, when executing the instructions, to: generate one or more patterns of behavior corresponding to a security breach at a first company; store the generated one or more patterns in a pattern repository; compare at least one of the one or more patterns with one or more standardized log files for the first company to identify one or more first log entries related to the behavior corresponding to the security breach; and process at least one pattern of the one or more patterns with one or more standardized log files for a second company to identify log entries of the second company that indicate a possible security breach at the second company.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this disclosure, illustrate various embodiments and aspects of the present disclosure. In the drawings.

DETAILED DESCRIPTION

Figure 1:
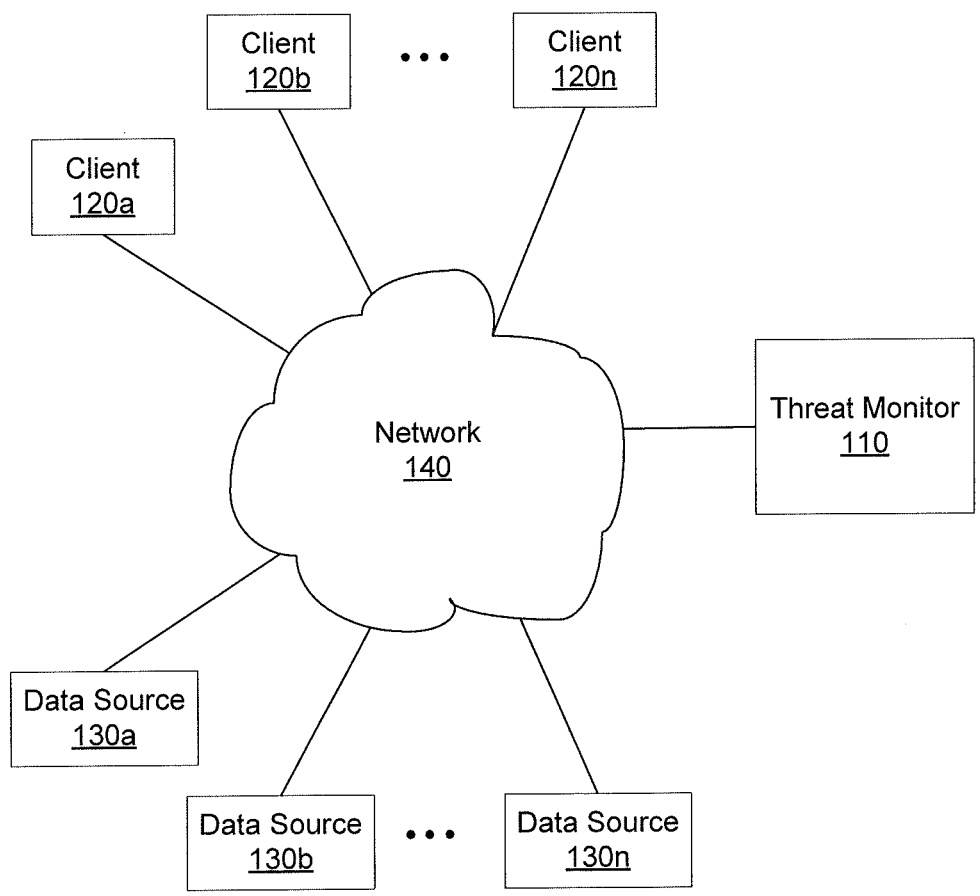
FIG. 1 is an exemplary system for performing threat assessments, consistent with certain disclosed embodiments.

The following detailed description refers to the accompanying drawings. Wherever possible, the same reference numbers are used in the drawings and the following description to refer to the same or similar parts. While several exemplary embodiments and features are described herein, modifications, adaptations and other implementations are possible, without departing from the spirit and scope of the disclosure. For example, substitutions, additions or modifications may be made to the components illustrated in the drawings, and the exemplary methods described herein may be modified by substituting, reordering or adding steps to the disclosed methods. Accordingly, the following detailed description does not limit the disclosure. Instead, the proper scope of the disclosure is defined by the appended claims.

Companies face threats from various places, e.g., internal to the company, external to the company, from cyberspace, etc. Sharing threat detection data among companies, whether in the same industries or not, will allow all of these companies to efficiently and effectively combat the threats and the risks associated with them. For example, leveraging information obtained by businesses or other entities affected by external or cyber threats, whether experienced through the denial of service attacks, hacking, espionage, malware, or spoofing, will allow other companies to identify those same threats and take measures protect their physical and intellectual assets.

Systems and methods consistent with the present disclosure use patterns corresponding to one or more behaviors to be stored and used to identify potential security breaches. Further, certain embodiments evaluate data from a variety of sources, thus improving performance and reliability. Moreover, a threat assessment system consistent with the present disclosure may identify the data related to the actions or series of actions, transforming the data into patterns of behavior that may be more readily evaluate and compared against known threat behavior. In this manner, systems consistent with the present disclosure may reduce complexity, thereby improving performance and reliability, in performing threat assessment without reducing the ability to apply sophisticated analytic techniques to detect threats.

By way of a non-limiting example, FIG. 1 illustrates a system 100 in which the features and principles of the present disclosure may be implemented. The number of components in system 100 is not limited to what is shown, and other variations in the number and/or arrangements of components are possible, consistent with embodiments of the disclosure. The components of FIG. 1 may be implemented through hardware, software, firmware, etc. System 100 may include clients 120 (e.g., client 120a, client 120b, through client 120n), threat monitor 110, data sources 130 (e.g., data source 130a, data source 130b, through data source 130n), and network 140.

Clients 120 may each be a company, an enterprise, division, or department within a company, a common enterprise, division, or department across companies, a business, or any other entity. Clients 120 may each include one or more apparatus configured to provide one or more users with an interface to network 140. By way of example, clients 120 may be implemented using any device capable of accessing a data network, such as, for example, a general purpose computer or personal computer equipped with a modem or other network interface. Clients 120 may also be implemented in other devices, such as, for example, laptop computers, desktop computers, mobile phones (with data access functions), Personal Digital Assistant ("PDA") with a network connection, IP telephony phone, or generally any device capable of communicating over a data network, such as, for example, network 140.

In some embodiments, clients 120 may be configured to transmit and/or receive data to/from threat monitor 110. Data may be entered into and/or stored on one or more clients 120. The data may include, for example, one or more software logs, one or more firmware logs, one or more database logs, one or more server logs, one or more router logs, one or more security device logs, one or more hardware logs, etc. Client 120 may store and/or later transmit the data to threat monitor 110, which may, in turn, receive the data, as well as store and/or analyze the data. Threat monitor 110 may facilitate sharing threat-related data among clients 120. For example, a company may use threat monitor 110 to learn about potential threats based on security breaches at other similar companies.

Data sources 130 may include one or more sources of data, including databases, data libraries, data entry systems, document collection devices, etc. In some disclosed embodiments, data sources 130 may organize and store data for performing threat assessment. In some embodiments, data sources 130 may include data previously received from threat monitor 110 (i.e., historical data). Data provided by data sources 130 may include data corresponding to any type of information, including, for example, demographic data, credit and/or financial data (e.g., credit bureau information, banking information, credit union information, lender information, etc.), employer and/or employee data (e.g., employer name, employer taxpayer identification number, employer address, taxable income, identification of employees, distributions to employees and/or government agencies, etc.), tax data (e.g., a taxpayer's name, address, social security number, tax ID number, taxable income, number of exemptions, deductions, tax credits, etc.), government data sources, publically-available data sources (e.g., GOOGLE™, etc.), commercial data sources (e.g., LEXIS NEXIS™, etc.), data libraries and/or data pattern repositories, etc. In addition, data sources 130 may include one or more database managements systems, which store database contents, allow data creation and maintenance, perform searches, provide security and backup, and allow other data accesses. Data may be raw data, processed data, semi-processed data, or any combination thereof.

Threat monitor 110 may provide a platform for exchanging (e.g., sending and/or receiving) data with clients 120 and/or exchanging (e.g., sending and/or receiving) data with data sources 130, consistent with certain disclosed embodiments. Threat monitor 110 may be implemented using a combination of hardware, software, firmware, etc., and may be operable to receive and store data from various clients 120. In some embodiments, threat monitor 110 may receive data from clients 120 regarding anomalous behavior and/or behavior that has been previously identified as relating to potential and/or possible security breaches. In addition, threat monitor 110 may also generate one or more alerts relating to potential and/or possible security breaches, for example, based on the data received in connection with one or more clients 120.

In an embodiment, the functionality of threat monitor 110 may be implemented on a single device or system. In an alternative embodiment, the functionality of threat monitor 110 may be distributed amongst a plurality of devices or systems without departing from the scope of this disclosure. Additionally, in some embodiments, threat monitor 110 may be operated and/or implemented by one or more clients 120. For example, when one or more clients 120 are divisions or departments within a single company, the company may operate and/or implement threat monitor 110. In other embodiments, threat monitor 110 may be operated and/or implemented by a third party vendor in support of clients 120.

Network 140 provides communication between or among the various entities in system 100. Network 140 may be a shared, public, or private network and may encompass a wide area network (WAN), local area network (LAN), an intranet, and/or the Internet. Network 140 may be implemented through any suitable combination of wired and/or wireless communication networks, including Wi-Fi networks, GSM/GPRS networks, TDMA networks, CDMA networks, Bluetooth networks, or any other wireless networks. Further, the entities of system 100 may be connected to multiple networks 130, such as, for example, to a wireless carrier network, a private data network, and the public Internet.

Figure 2:
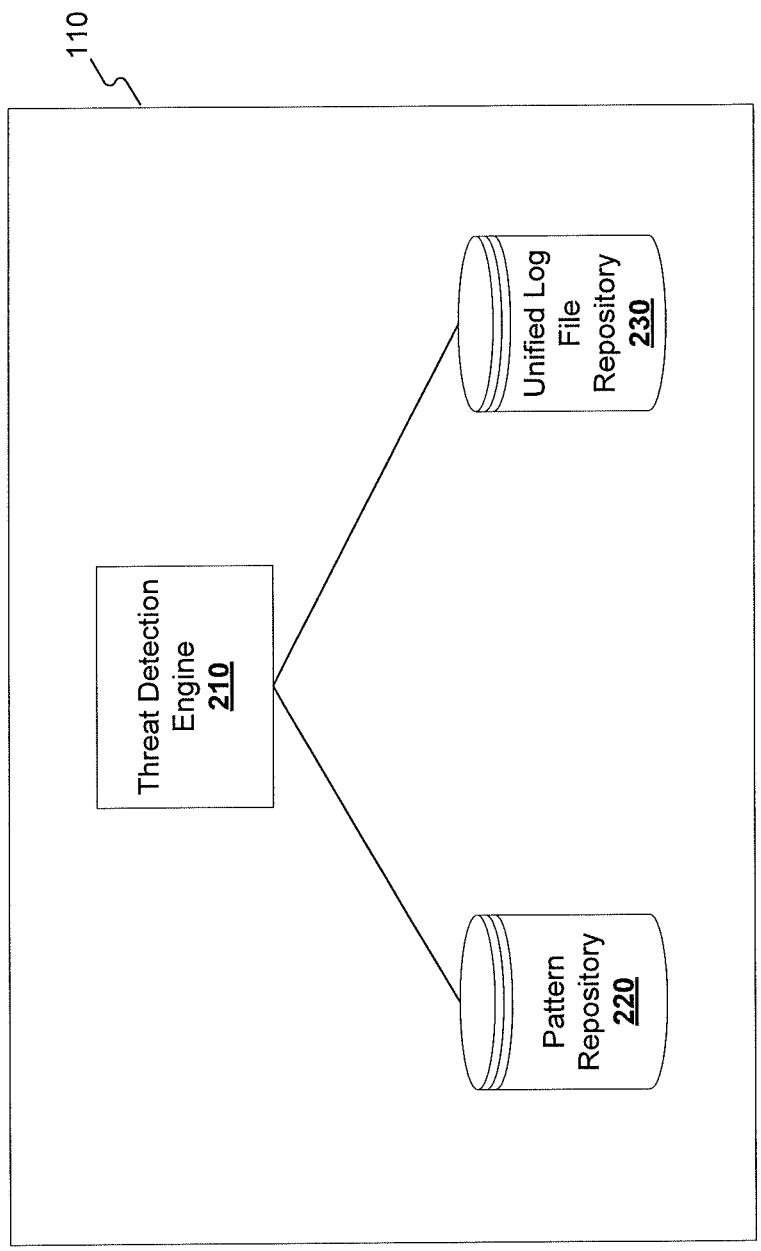
FIG. 2 is a schematic view of an exemplary threat monitor for performing threat assessments, consistent with certain disclosed embodiments.

FIG. 2 is a schematic view of threat monitor 110, consistent with certain disclosed embodiments. As discussed above, threat monitor 110 may be operated and/or implemented by client 120 and/or a third party vendor in support of client 120 to perform threat assessments. As shown in FIG. 2, threat monitor 110 may include one or more pattern repositories 220 and one or more unified log file repositories 230. The one or more pattern repositories 220 may be used to store one or more patterns associated with behavior, e.g., actions and/or series of actions, determined to potentially be indicative of a security breach. In some embodiments, the one or more patterns may be behavior profiles. Behavior profiles may correspond to a peer group, to an industry, to a project, to a set of skills, etc. One or more unified log file repositories 230 may be comprised of log files derived from and/or provided by clients 120. The one or more pattern repositories 220 and one or more unified log file repositories 230 may be implemented through, for example, one or more storage devices. Threat detection engine 210 may access pattern repository 220 and/or unified log file repository 230 to identify potential and/or possible security breaches at one or more clients 120.

Figure 3:
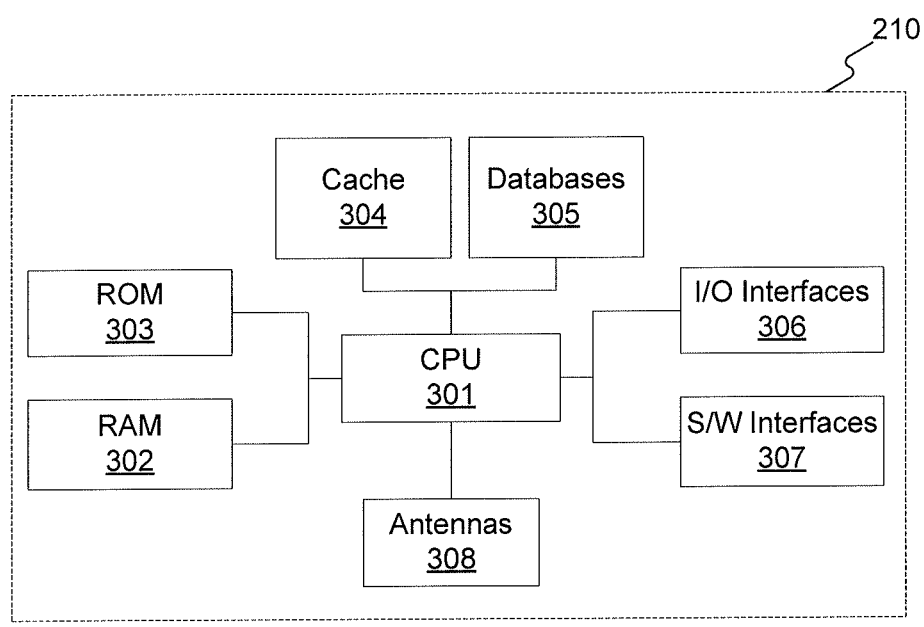
FIG. 3 is a schematic view of an exemplary computing system for performing threat assessments, consistent with certain exemplary embodiments.

FIG. 3 is a schematic view of threat monitor 110, consistent with certain disclosed embodiments. As shown in FIG. 3, threat monitor 110 may include one or more of the following components: at least one central processing unit (CPU) 301 (also referred to herein as a processor) configured to execute computer program instructions to perform processes and methods consistent with the disclosed exemplary embodiments, random access memory (RAM) 302 and read only memory (ROM) 303 configured to access and store information and computer program instructions, cache 304 to store data and information, one or more databases 305 to store tables, lists, or other data structures, I/O interfaces 306 (including, for example, interfaces to network 140, one or more displays (not shown), one or more printers (not shown), one or more keyboards (not shown), etc.), software and firmware interfaces 307 (including, for example, interfaces to one or more user interfaces, etc.), antennas 308 for wireless transmission and/or reception of data and/or other information, etc.

Figure 4:
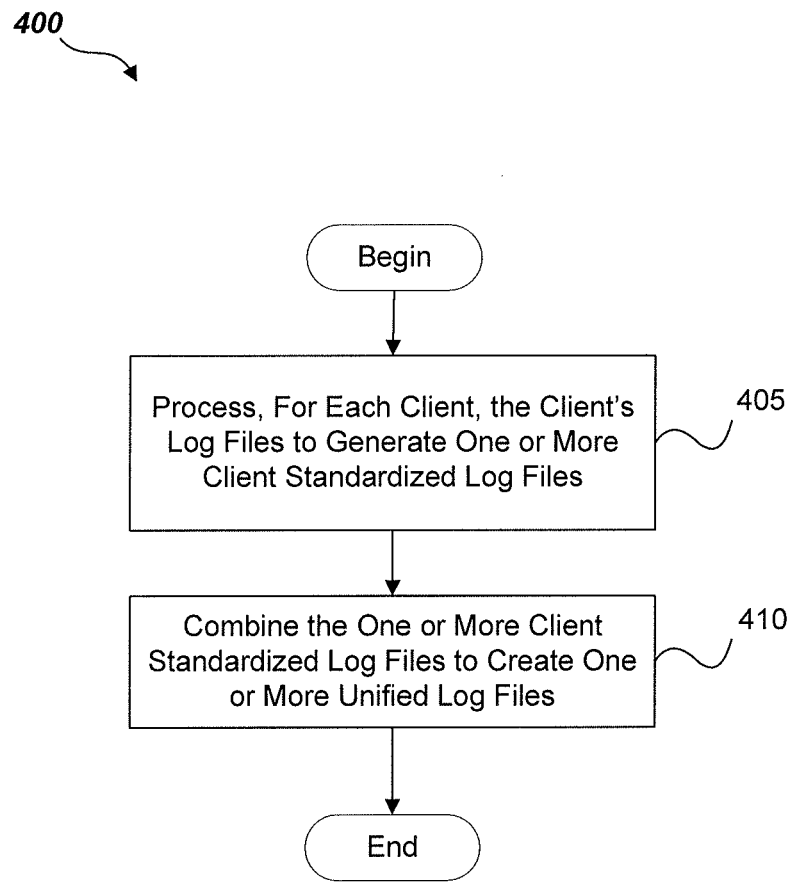
FIG. 4 is an exemplary flowchart illustrating an exemplary method for performing threat assessments, consistent with certain exemplary embodiments.

FIG. 4 is an exemplary flowchart 400 illustrating a process for generating one or more unified log files for storage in one or more unified log file repositories 230, consistent with certain disclosed embodiments. Specifically, FIG. 4 illustrates an implementation in which central processing unit 301 of threat detection engine 210 performs data collection, analysis, and transformation of data to enable performance of threat assessments relating to potential and/or possible security breaches. For example, client 120 and/or a third party provider may implement the process illustrated by flowchart 400 to prepare data for performing threat assessments relating to potential and/or possible security breaches, etc. Although the steps of flowchart 400 are described in a particular order, one skilled in the art will appreciate that these steps may be performed in a modified or different order, or that certain steps may be omitted or other steps added. Further, one or more of the steps in FIG. 4 may be performed concurrently or in parallel.

Figure 5:
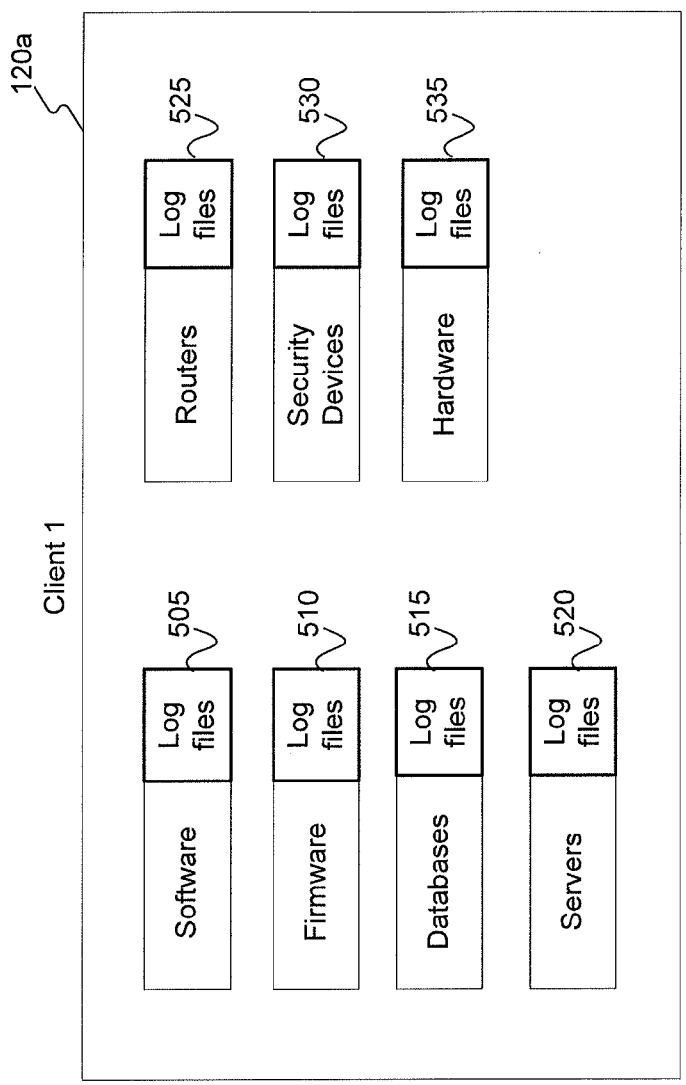
FIG. 5 is a schematic view illustrating an exemplary method for performing threat assessments, consistent with certain exemplary embodiments.

As shown in FIG. 4, threat monitor 110 may facilitate processing of one or more client log files for client 120 to generate one or more client standardized log files (step 405). Referring to FIG. 5, which illustrates exemplary client log files for client 120a, the one or more client log files may include, for example, software log files 505, firmware log files 510, database log files 515, server log files 520, router log files 525, security device log files 530, hardware log files 535, etc. The one or more client standardized log files may be standardized such that, for example, common data fields across each of the log files are correlated, data types in common data fields are identified similarly (e.g., a character type, a numerical type, etc.), data field sizes of the same data types may be made the same and/or consistent with one another, data descriptors are used similarly, etc. In one embodiment, the one or more client standardized log files may be stored in one or more storage locations of threat monitor 110, such as databases 305, described in connection with FIG. 3.

Next, the one or more client standardized log files may be combined to create one or more unified log files (step 410). The one or more unified log files may be, for example, unified within a single client 120, between one or more clients 120, or among one or more clients 120. For example, when each of clients 120 is a division or department within a single company, the one or more unified log files may be created between the one or more clients 120. In one embodiment, the one or more company standardized log files may be stored in one or more storage locations of threat monitor 110, such as one or more unified log file repositories 230, described above in connection with FIG. 2.

Figure 6:
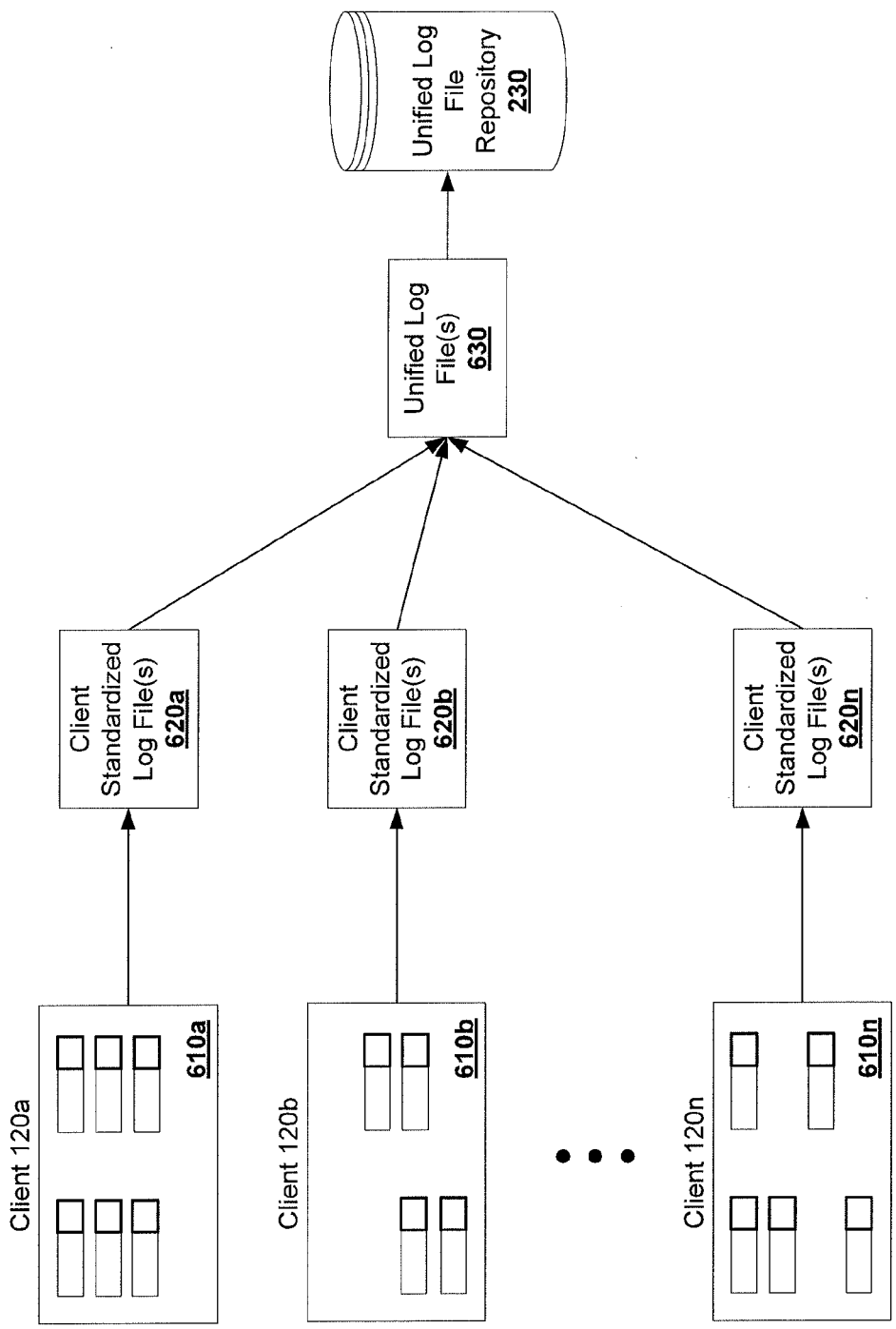
FIG. 6 is a schematic view illustrating an exemplary method for performing threat assessments, consistent with certain exemplary embodiments.

FIG. 6 illustrates one exemplary embodiment corresponding to the process of flowchart 400 of FIG. 4. In embodiments disclosed in FIG. 6, a client standardized log file may be created for each client 120. That is, as shown in FIG. 6, each client 120 may include one or more client log files 610, e.g., client 120a may include client log files 610a, client 120b may include client log files 610b, client 120n may include client log files 610n, etc. As illustrated in FIG. 6, the number, contents, and/or format of client log files 610 may vary for each client 120. For example, client 120a may include six client log files 610a, whereas client 120b may include four client log files 610b, and client 120n may include five client log files 610n.

Next, each of the one or more client log files 610 may be standardized to generate client standardized log files 620. As one example, client log files 610a of client 120a may be standardized to generate one or more standardized log files 620a, client log files 610b of client 120b may be standardized to generate one or more standardized log files 620b, client log files 610n of client 120n may be standardized to generate one or more standardized log files 620n, etc. Finally, client standardized log files 620 may be combined to generate one or more unified log files 630, for example, which may be stored in one or more unified log file repositories 230, as described in connection with FIG. 2. By standardizing log files, clients 120 may process data from a number of log files which, in turn, may allow clients 120 to more easily identify anomalous data, such as, for example, a higher number of failed login attempts for one server than another. As another example, standardizing log files may allow threat monitor 210 to more readily identify threat patterns.

Figure 7:
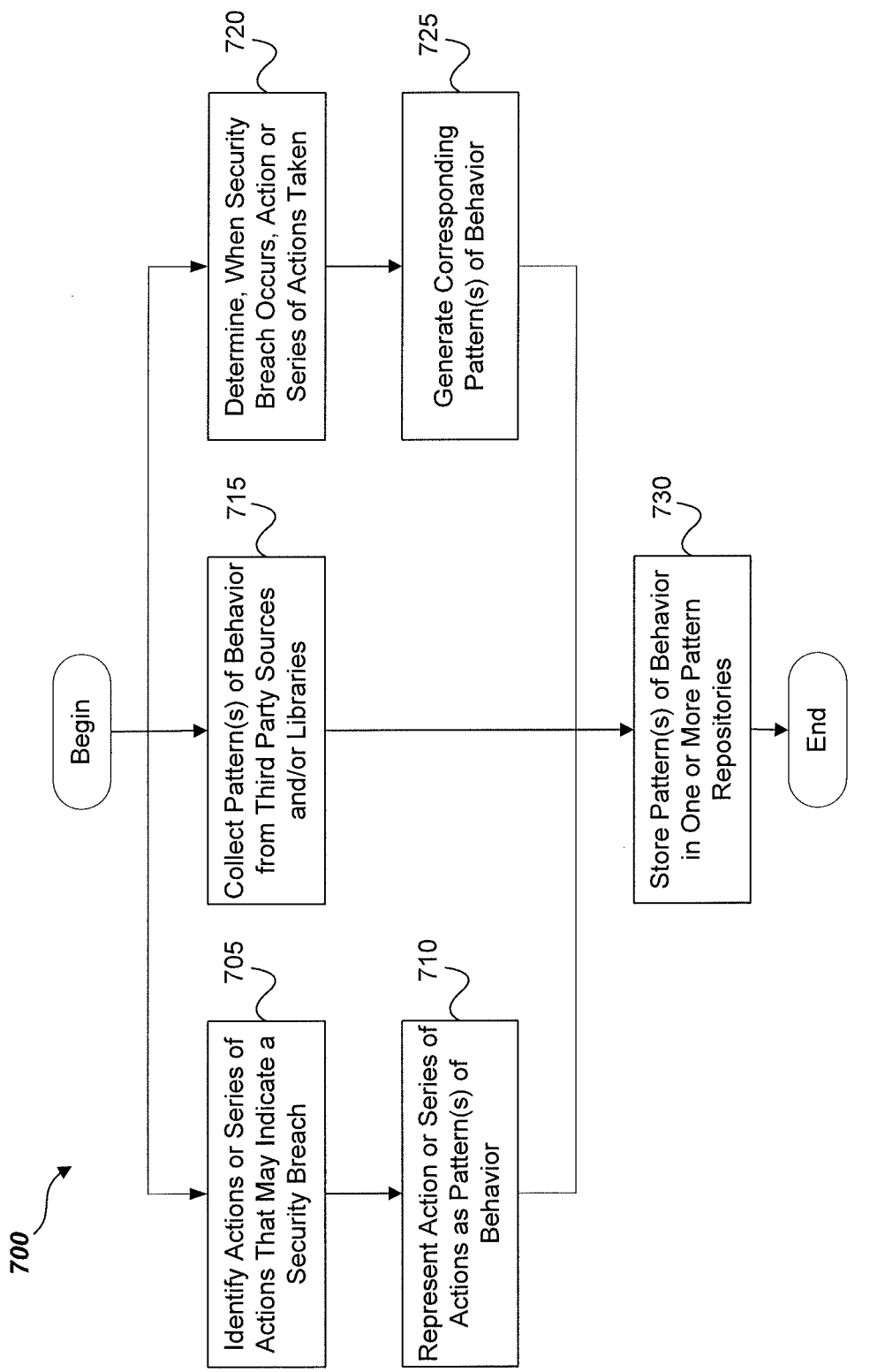
FIG. 7 is an exemplary flowchart illustrating an exemplary method for performing threat assessments, consistent with certain exemplary embodiments.

FIG. 7 is an exemplary flowchart 700 illustrating a process for generating one or more patterns for storage in one or more pattern repositories 220, consistent with certain disclosed embodiments. Specifically, FIG. 7 illustrates an implementation in which central processing unit 301 of threat detection engine 210 performs data collection, analysis, and transformation of data corresponding to actions or series of actions for performing threat assessments. For example, client 120 and/or a third party provider may implement the process illustrated by flowchart 700 to prepare data corresponding to actions or series of actions for threat assessment, etc. Although the steps of flowchart 700 are described in a particular order, one skilled in the art will appreciate that these steps may be performed in a modified or different order, or that certain steps may be omitted or other steps added. Further, one or more of the steps in FIG. 7 may be performed concurrently or in parallel.

As shown in FIG. 7, threat monitor 110 may identify actions or series of actions that may indicate a potential and/or possible security breach (step 705). Such actions or series of actions may include, by way of example, threat monitor 110 may identify unusual or unexpected data accesses, unusual or unexpected data downloading, and/or data storage to unknown storage devices as being indicative of a potential and/or possible security breach. As an exemplary scenario, threat monitor 110 may identify a series of actions corresponding to an employee being present in the workplace outside of that employee's normal work hours and accessing material that employee does not normally access. Threat monitor 110 may represent the identified actions or series of actions as a pattern or patterns of behavior (step 710), and store the pattern or patterns of behavior in one or more pattern repositories 220 (step 730).

Threat monitor 110 may also collect one or more patterns of behavior from third party sources and/or libraries (step 715). For example, threat monitor 110 may receive demographic data, credit and/or financial data, employer and/or employee data, etc. from one or more publically-available data sources (e.g., GOOGLE™, etc.), commercial data sources (e.g., LEXIS NEXIS™, etc.), etc. Threat monitor 110 may store the collected pattern or patterns of behavior in one or more pattern repositories 220 (step 730).

In addition, threat monitor 110 may determine, when a security breach occurs, actions or series of actions taken (step 720). In some embodiments, threat monitor 110 may determine actions or series of actions taken prior to a security breach, and the determination may take place after the security breach has been detected. In other embodiments, threat monitor 110 may determine actions or series of actions related to a potential or possible security breach, and the determination may take place contemporaneously with the potential or possible security breach. That is, as a potential or possible security breach is occurring, threat monitor 110 may detect the potential or possible security breach and determine the actions or series of actions taken in connection with the potential or possible security breach. Threat monitor 110 may represent the identified actions or series of actions as a pattern or patterns of behavior (step 725), and store the pattern or patterns of behavior in one or more pattern repositories 220 (step 730).

Figure 8:
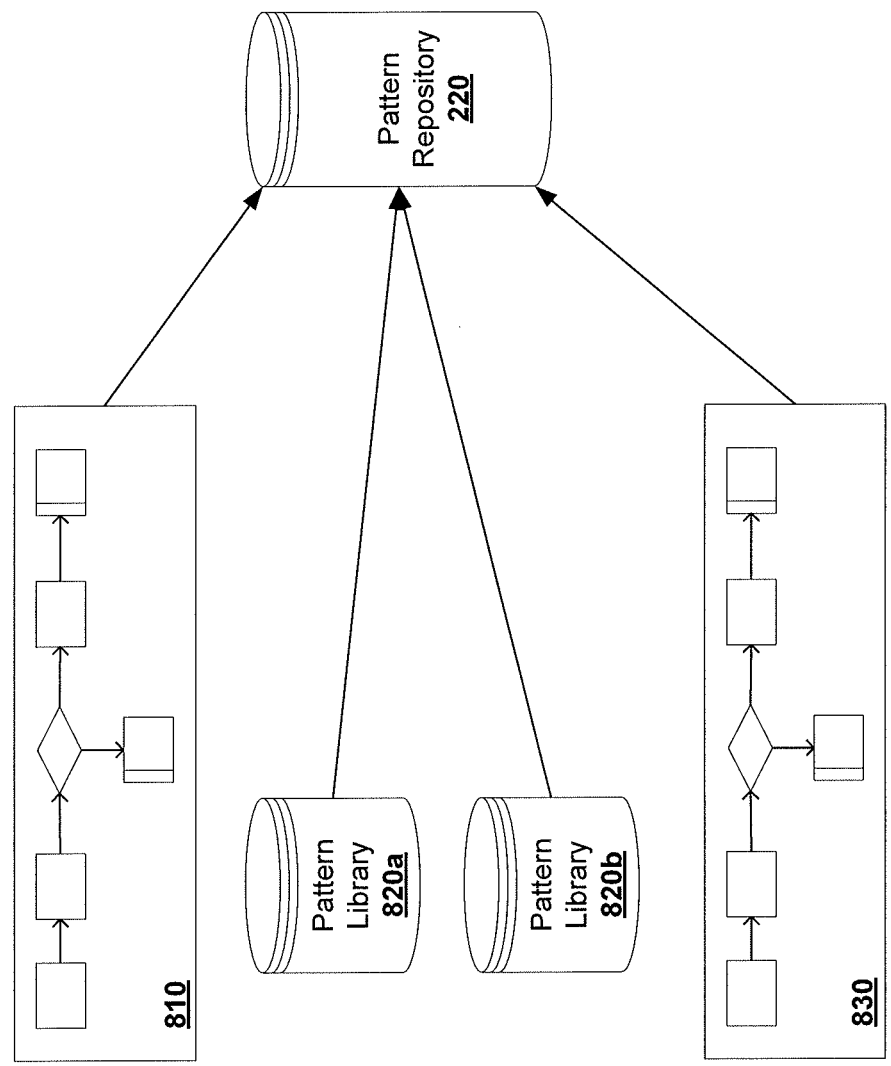
FIG. 8 is an exemplary schematic view illustrating an exemplary method for performing threat assessments, consistent with certain exemplary embodiments.

FIG. 8 is a diagram illustrating a process for identifying and storing patterns in one or more pattern repositories 220 by threat monitor 110, consistent with certain disclosed embodiments. As illustrated in FIG. 8, threat monitor 110 may represent identified actions or series of actions indicative of a potential and/or possible security breach as one or more patterns 810, and store the one or more patterns 810 in one or more pattern repositories 220. Threat monitor 110 may also collect one or more patterns from one or more pattern libraries 820, e.g., pattern library 820a and pattern library 820b, and store the one or more patterns in one or more pattern repositories 220. In addition, threat monitor 110 may determine that a security breach has occurred, and represent identified actions or series of actions indicative of the determined security breach as a pattern 830, and store the pattern 830 in one or more pattern repositories 220. By identifying and/or collecting patterns 830, threat monitor 110 may be more prepared to quickly and efficiently identify and respond to future security breaches which may, in turn, improve security for clients 120 and reduce costs due to lost or stolen physical and intellectual assets.

Figure 9:
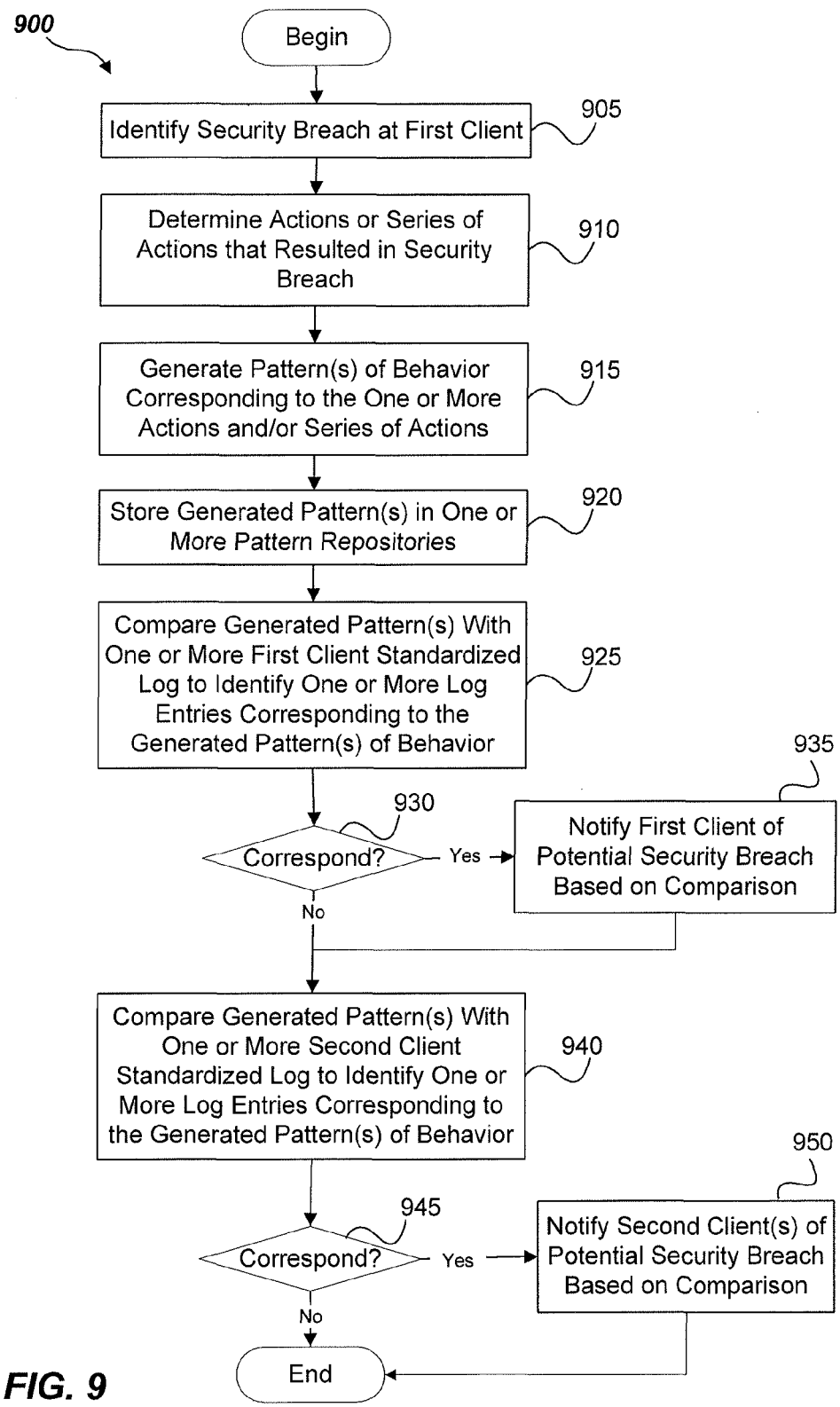
FIG. 9 is an exemplary flowchart illustrating an exemplary method of threat assessment, consistent with certain exemplary embodiments.

FIG. 9 is an exemplary flowchart 900 illustrating a process for performing threat assessments, consistent with certain disclosed embodiments. Specifically, FIG. 9 illustrates an implementation in which central processing unit 301 of threat monitor 110 performs data collection, analysis, and transformation of data for performing assessments associated with potential and/or possible security breaches. For example, client 120 and/or a third party provider may implement the process illustrated by flowchart 900 to prepare data for threat assessment, etc. Although the steps of flowchart 900 are described in a particular order, one skilled in the art will appreciate that these steps may be performed in a modified or different order, or that certain steps may be omitted or other steps added. Further, one or more of the steps in FIG. 9 may be performed concurrently or in parallel.

In FIG. 9, threat monitor 110 may identify a security breach at a first client 120, e.g., client 120a (step 905). Threat monitor 110 may determine actions or series of actions that resulted in the identified security breach at the first client 120 (step 910). Threat monitor 110 may use the determined actions or series of actions that resulted in the identified security breach to generate one or more patterns of behavior (step 915), and threat monitor 110 may store the generated patterns of behavior in one or more pattern repositories 220 (step 920).

Once threat monitor 110 has generated and stored one or more patterns, threat monitor 110 may compare the generated one or more patterns with one or more standardized log files of the first client 120, e.g., client 120a, to identify one or more first log entries that may correspond to the generated one or more patterns (step 925). The one or more first log entries may be determined to correspond to the generated one or more patterns if there is a predetermined threshold of similarity between the one or more first log entries and the generated one or more patterns. For example, if a generated pattern of behavior consists of six actions performed in a particular order, and the standardized log files identify five of the six actions performed in that same particular order by one individual, then the one or more first log entries may be determined to be corresponding to the generated patterns. The predetermined threshold may be determined by any statistical or analytical method. In some embodiments, the comparison may be performed by a combination of automated computing supplemented by a human review and/or analysis.

If one or more corresponding log entries are identified (step 930, Yes), threat monitor 110 may notify the first client 120 of a potential and/or possible security breach (step 935). If one or more corresponding log entries are not identified (step 930, No) or one or more corresponding log entries are identified and the first client 120 notified, threat monitor 110 may compare the generated one or more patterns with one or more standardized log files of one or more second clients 120, e.g., client 120b through client 120n, to identify one or more second log entries that may correspond to the generated one or more patterns (step 940). If one or more corresponding log entries are identified (step 945, Yes), threat monitor 110 may notify the one or more second clients 120 of a potential and/or possible security breach (step 950). If one or more corresponding log entries are not identified (step 945, No) or one or more corresponding log entries are identified and the one or more second clients 120 notified, the process of FIG. 9 may end.

In some embodiments, when one or more corresponding log entries are identified (step 930, Yes), one or more service support team staff may review the case and respond appropriately. The response may include contacting a client security operations center (SOC) and providing an alert of the incident (step 935). Client SOC may then request that a client investigation team do further review. Alternatively and/or additionally, the response may include contacting the client investigation team directly.

Threat monitor 110 may also include an analytics team to analyze feedback received from each of one or more clients 120 to determine successes and/or failures of the system and perform behavior pattern maintenance. Some of the feedback may also be provided to clients 120 to analyze user feedback received from one or more of individual and/or multiple client 120, and determine when behavior patterns are to be updated.

As an example of the process of FIG. 9, if a security breach is identified at client 120, such as a hacking event, threat monitor 110 may be configured to generate a pattern corresponding to that hacking event. Such a pattern may include, for example, a quantity of preliminary access attempts by one or more identified internet protocol (IP) addresses and servers, the dates and times of the preliminary access attempts, the duration of the preliminary access attempts, etc. After storing the generated pattern in one or more pattern repositories 220, threat monitor 110 may periodically review the standardized log files of client 120a to identify a patterns corresponding to the stored pattern. For example, if the pattern used threat monitor 110 includes ten preliminary access attempts between the hours of 1:00 AM and 3:00 AM on Tuesdays and Wednesdays for three consecutive weeks from a single IP address originating in a particular foreign country, threat monitor 110 may determine that a pattern of six preliminary access attempts between the hours of 12:30 AM and 3:00 AM on Tuesdays for two consecutive weeks from that same foreign country is sufficiently similar to the stored pattern, and therefore corresponds to the stored pattern. Threat monitor 110 may then notify client 120a of this correspondence so that client 120a may take preventative actions, such as, for example, limiting access from that particular country, deny access to that particular IP address or a block of IP addresses, etc. Threat monitor 110 may also perform the same analysis, using the same pattern, at other clients 120, and may notify the other clients 120 if a sufficiently corresponding pattern is found in their respective standardized log files.

Figure 10:
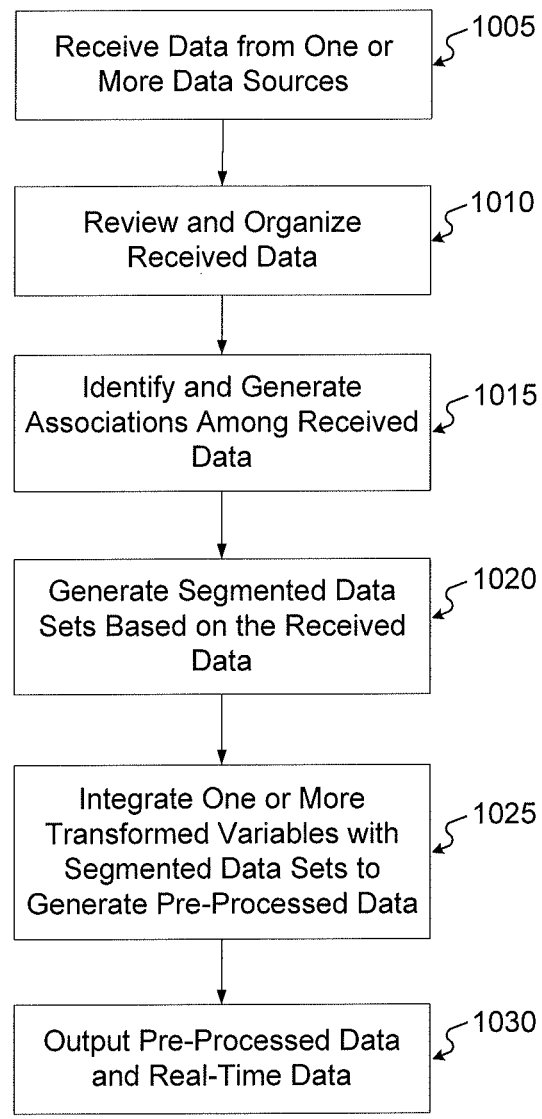
FIG. 10 illustrates a flowchart of an exemplary data creation process for a method of threat assessment, consistent with certain exemplary embodiments.

FIG. 10 is an exemplary flowchart 1000 illustrating a process for threat data processing in a threat detection engine, such as, for example, threat detection engine 210, in accordance with certain implementations. Specifically, FIG. 10 illustrates an implementation in which central processing unit 301 of threat detection engine 210 performs data collection, analysis, and transformation for threat scoring and threat-based assessments. The embodiment disclosed by FIG. 10 may be used in conjunction with the embodiments previously disclosed. For example, the process for threat data processing may be used in the process of creating, refreshing, rebuilding, and/or retiring patterns. Although the steps of the flowchart are described in a particular order, one skilled in the art will appreciate that these steps may be performed in a modified or different order, or that certain steps may be omitted or other steps added. Further, one or more of the steps in FIG. 10 may be performed concurrently or in parallel.

As shown in FIG. 10, threat detection engine 210 may receive data from one or more data sources (1005). The one or more data sources may include, for example, one or more data sources 130, as described above in connection with FIG. 1. In some embodiments, threat detection engine 210 may send a query to data sources 130, requesting the data. Alternatively and/or additionally, data sources 130 may send data to threat detection engine 210 automatically, including, for example, at predetermined times (e.g., daily, weekly, monthly, etc.) or when predetermined conditions have been met (e.g., a predetermined amount of data has been collected, a predetermined threshold has been met, a predetermined triggering event has occurred, etc.). The received data may include, for example, demographic data, credit and/or financial data, employer and/or employee data, tax data, data compilations, etc. In addition, the received data may include unstructured data, data from documents received via one or more clients 120, and/or any other type of data. The received data may be stored in one or more storage locations of threat detection engine 210, such as one or more databases 305.

Figure 11:
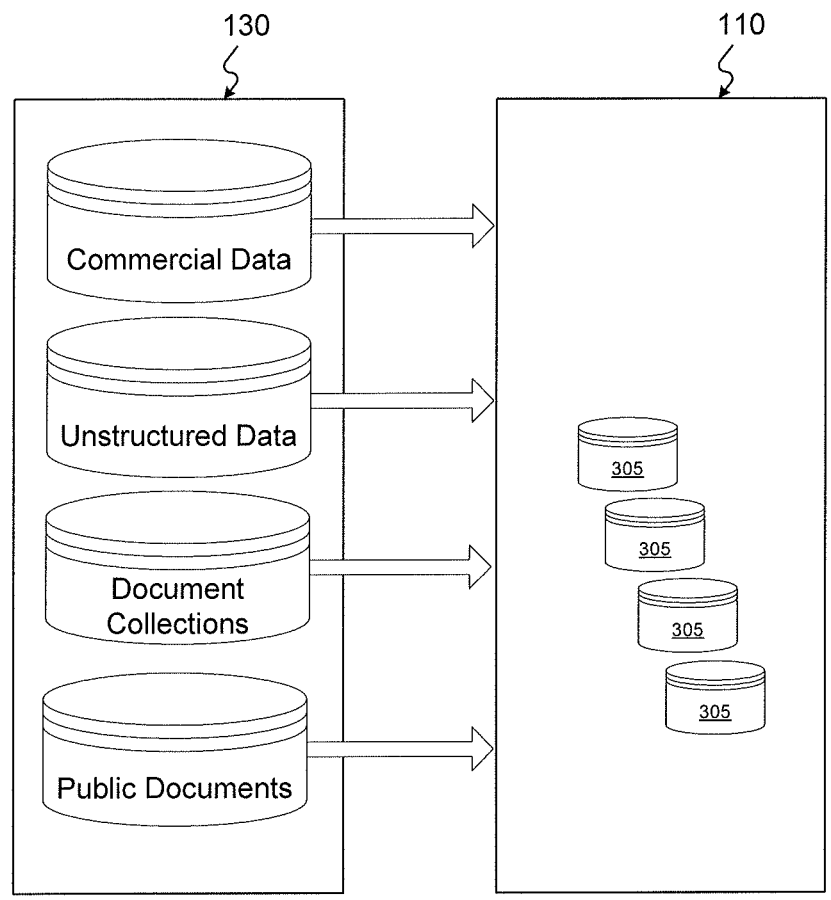
FIG. 11 illustrates an exemplary data creation process for a method of threat assessment, consistent with certain exemplary embodiments.

FIG. 11 is a diagram illustrating a process for receiving data by threat detection engine 210, and storing the received data in database 305 of threat detection engine 210, consistent with certain disclosed embodiments. In FIG. 11, data from multiple, disparate sources is staged such that initial data profiling and data cleansing may be applied. As shown in FIG. 11, one or more external data sources 130 may send data to threat detection engine 210. Threat detection engine 210 may, in turn, store the received data in one or more databases 305. As illustrated in FIG. 11, the received data may include any type of data including unstructured data, commercial data, document collections, public data, etc.

Referring again to FIG. 10, threat detection engine 210 may review and organize the received data (1010). Reviewing and organizing the received data may, for example, include initial data profiling and data cleansing based on one or more data elements of the received data. Initial data profiling may include compiling the received data into one or more data element groups and/or data element ranges. For example, if the received data includes tax data, the one or more data element groups may include tax filing status (e.g., single, married, head of household, etc.) and the one or more data element ranges may include ranges of adjusted gross income. Cleansing the received data may include, for example, identifying any data elements that may be in a non-standard or non-preferred format, and changing the data elements to a standard or preferred format. For example, United States ZIP code data elements having five digit ZIP codes may be changed to nine digit ZIP codes (so-called "ZIP+4"). As another example, null values in certain data elements may be changed to predetermined values, which may include zero values. Threat detection engine 210 may store the reviewed and organized data in, for example, one or more databases 305. In other embodiments, threat detection engine 210 may provide the one or more reviewed and organized data to one or more external data sources 130 and/or in response to requests from one or more users.

Threat detection engine 210 may identify and generate associations among the received data (1015). The associations may be identified and generated within data received from a single data source 130 and/or between data received from more than one data source 130. Threat detection engine 210 may store the generated associations as links to identify relationships between data elements. Associations may be generated to identify one or more relationships between one or more source-centric data views and one or more entity-centric data views.

Source-centric data views may be the data views associated with the source from which the data was received (e.g., data sources 130). Entity-centric data views may be data sets associated with an entity about which the data may relate. For example, in a tax return embodiment, the entities may include, for example, one or more tax returns, one or more taxpayers, one or more tax preparers, one or more employers, etc. As such, an entity-centric data view for a taxpayer may include a view of all data associated with a taxpayer, e.g., the taxpayer's name, address, social security number, occupation, etc. The entity-centric data view for a tax preparer may include, for example, information regarding the entity who prepared the taxpayer's tax return, such as, for example, an individual preparer, a tax preparation service, a tax preparation company, etc. The entity-centric data view for a taxpayer's employer may include, for example, information regarding the taxpayer's one or more employers for the tax return. Thus, for example, associations between a source-centric view of a taxpayer and an entity-centric data view of historical data may include a taxpayer's name and social security number.

Figure 12:
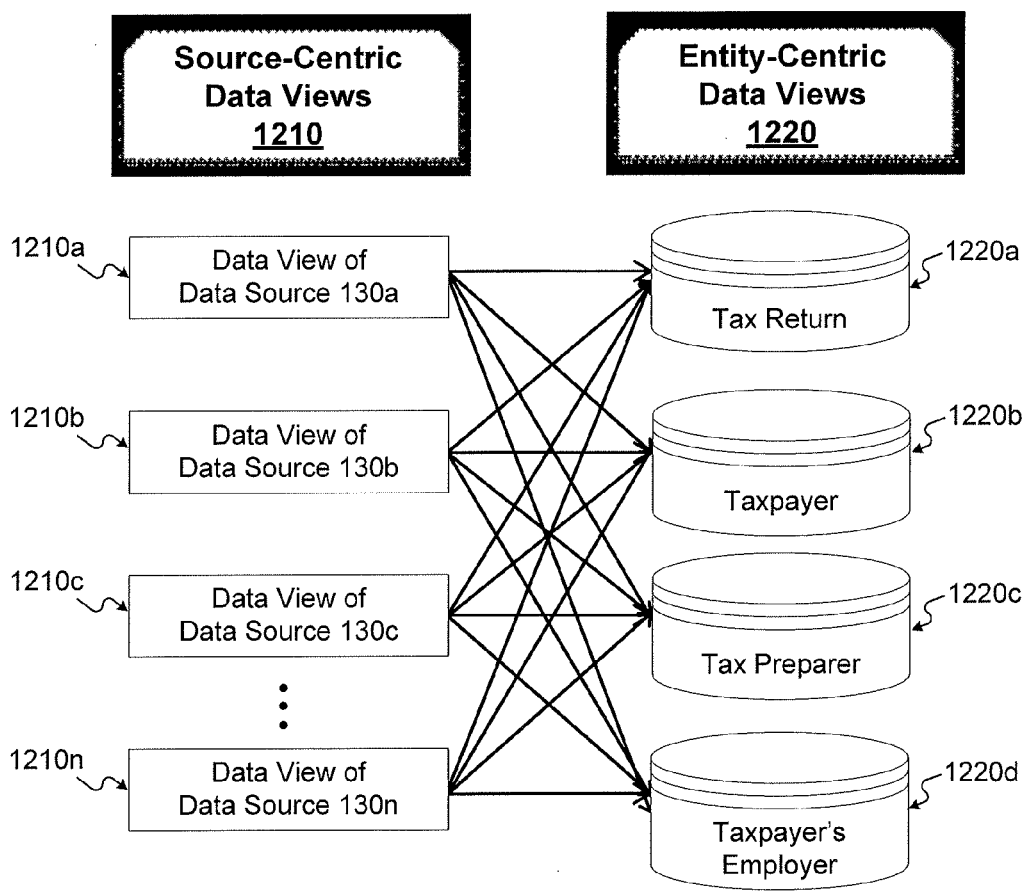
FIG. 12 illustrates an exemplary data structure for a method of threat assessment, consistent with certain exemplary embodiments.

FIG. 12 is a diagram illustrating a process of generating associations among received data and the transformation from source-centric views to entity-centric views, consistent with certain disclosed embodiments. As shown in FIG. 12, in one exemplary embodiment related to income tax returns, threat detection engine 210 may identify data elements contained within the received data and create associations between one or more data elements of source-centric data views 1210 (e.g., data view 1210a, data view 1210b, data view 1210c, through data view 1210n) and one or more data elements of entity-centric data views 1220 (e.g., entity data view 1 1220a, entity data view 2 1220b, entity data view 3 1220c, entity data view 4 1220d, etc.). For example, threat detection engine 210 may identify and generate associations between one or more data elements of source-centric data view 1210a and one or more data elements of each of entity-centric data views 1220a, 1220b, 1220c, and 1220d. In addition, threat detection engine 210 may identify and generate associations between one or more data elements of source-centric data view 1210b and one or more data elements of each of entity-centric data views 1220a, 1220b, 1220c, and 1220d, as well as identify and generate associations between one or more data elements of source-centric data views 1210c through 1210n and one or more data elements of each of entity-centric data views 1220a, 1220b, 1220c, and 1220d. Threat detection engine 210 may store the identified and generated associations as links in, for example, a database management system of database 305. In this manner, according to one exemplary embodiment, the received data may be transformed from source-centric data views to entity-centric data views, readying the data for analytic modeling.

Referring again to FIG. 10, threat detection engine 210 may create segmented data sets based on the received data (1020). Segmented data sets may be data sets that are either logically and/or physically divided, separated, organized, and/or sectioned from one another. In one exemplary embodiment, segmented data sets may be data sets that are logically organized to be distinct from other data sets. The segmented data sets may be used to identify changes in behavior and/or trending. In addition, the segmented data sets may assist in identifying changes in normative values, including intra-entity normative values (e.g., for a single return, for a single taxpayer, for a single tax preparer, for a single employer, etc.), inter-entity normative values (e.g., among a set of returns for a single taxpayer, among a set of returns for a set of taxpayers, among a set of taxpayers, among a set of taxpayers associated with a single employer, among a set of taxpayers associated with a single tax preparer, among a set of tax preparers, among a set of employers, etc.), etc.

In some embodiments, the segmented data sets may be temporally-segmented data sets (e.g., daily, weekly, monthly, annually, etc.) for each of one or more entities (e.g., returns, taxpayer, tax preparer, employer, etc.). Temporally-segmented data sets may be aggregated to larger time segments. In some embodiments, the temporally-segmented data may be aggregated for a single entity, multiple entities, or any combination thereof.

Figure 13:
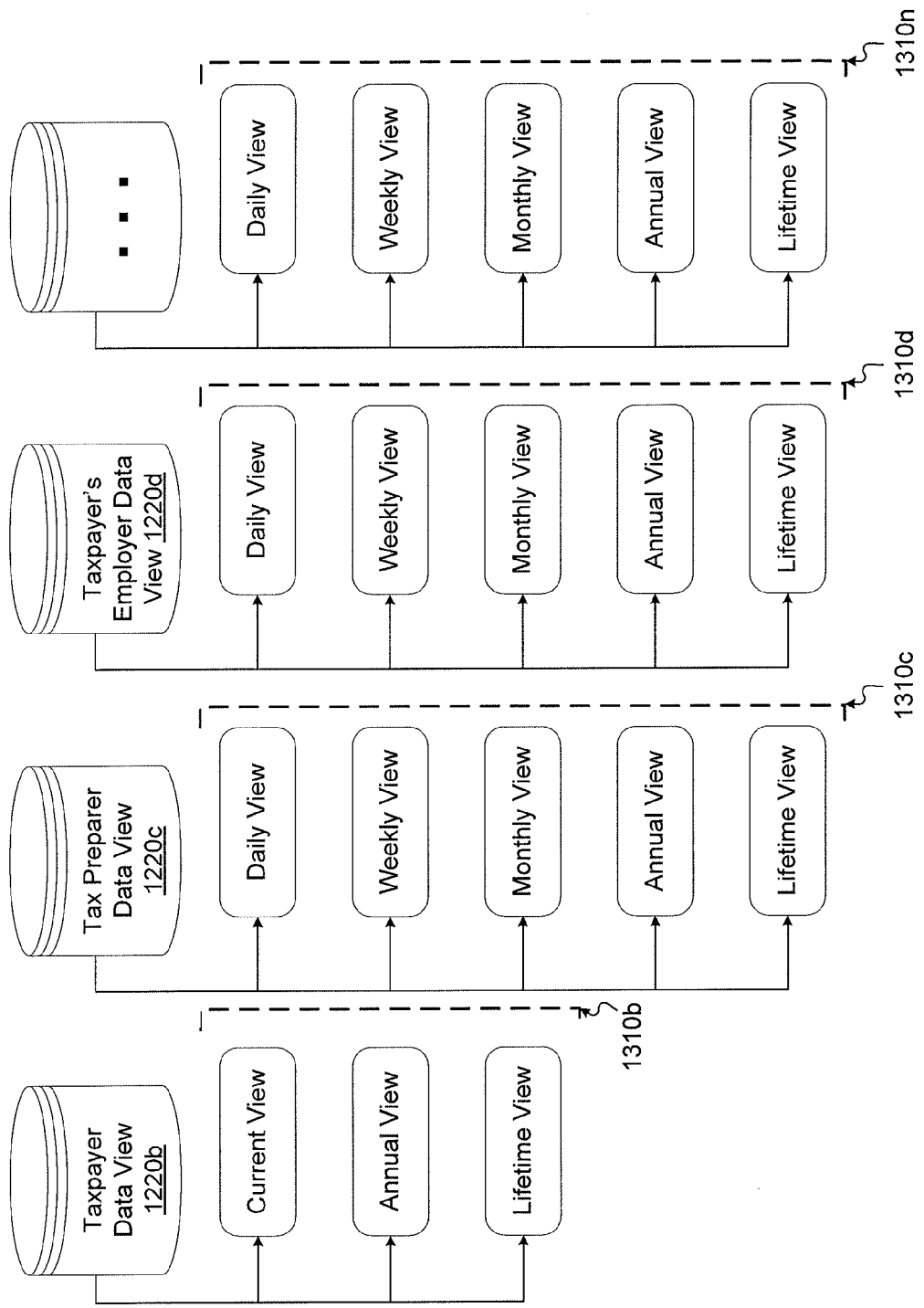
FIG. 13 illustrates an exemplary data structure for a method of threat assessment, consistent with certain exemplary embodiments.

FIG. 13 illustrates one exemplary embodiment of temporally-segmented data sets, consistent with certain disclosed embodiments. In an implementation for processing income tax returns, for example, the entity-centric data views 1220 may include a taxpayer data view 1220b, a tax preparer data view 1220c, and a taxpayer's employer data view 1220d. The temporally-segmented data sets for a taxpayer (i.e., taxpayer temporally-segmented data sets 1310b) may include, for example, a current view (e.g., the current tax return), an annual view (e.g., tax data received over the course of a year from, for example, the taxpayer's employer, etc.), and a lifetime view (e.g., every tax return a taxpayer has filed in their lifetime or the lifetime of the electronically-available data, or subsets thereof). The temporally-segmented data sets for a tax preparer (i.e., tax preparer temporally-segmented data sets 1310c) may include, for example, a daily view (e.g., data related to all tax returns filed in a given day), a weekly view (e.g., data related to all tax returns filed in a given week), a monthly view (e.g., data related to all tax returns filed in a given month), an annual view (e.g., data related to all tax returns filed in a given year), and a lifetime view (e.g., every tax return filed by a tax preparer in his/her lifetime or the lifetime of the electronically-available data). The temporally-segmented data sets for a taxpayer's employer (i.e., taxpayer's employer temporally-segmented data sets 1310d) may include, for example, a daily view (e.g., tax data related to employees reported to a tax authority in a given day), a weekly view (e.g., tax data related to employees reported to a tax authority in a given week), a monthly view (e.g., tax data related to employees reported to a tax authority in a given month), an annual view (e.g., tax data related to employees reported to a tax authority in a given year), and a lifetime view (e.g., tax data related to employees reported to a tax authority in a lifetime of the taxpayer's employer or the lifetime of the electronically-available data).

Returning to FIG. 10, threat detection engine 210 may integrate one or more transformed variables with the segmented data sets, such as the temporally-segmented data sets, to generate pre-processed data (1025). Generating pre-processed data may increase the speed by which data may be assessed, including threat-based assessment and threat scoring, consistent with the disclosed embodiments. In some embodiments, the transformed variables may replace one or more other data elements in the segmented data sets. In other embodiments, the transformed variables may supplement the data of the segmented data sets.

The one or more transformed variables may include, for example, categorical variables, calculated variables, trend variables, lifetime variables, etc. Raw variables may include any type of raw data received from one or more data sources 130. Categorical variables may include data associated with one or more categories of information. Again using the tax example, categorical variables may include a number of tax preparers associated with a tax preparation company, number of years a tax preparer has been in business, type of company (e.g., S-corporation, C-corporation, etc.), etc. Calculated variables may include any type of data obtained via simple calculations (e.g., addition, subtraction, etc.). Examples of calculated variables may include a total number of tax returns filed by a tax preparer, a total number of tax returns filed by a tax preparer within a certain time period, a total number of tax returns having a particular type of tax deduction, etc. Trend variables may include a summarization of data value changes over a specified period of time as compared to another predetermined period of time. Examples of trend variables include a total number of tax returns filed over the current week as compared to the total number of tax returns filed over the previous week, a value reflecting a rate of change in gross income from the current year versus the average gross income from the previous five years (e.g., increase, decrease, etc.), etc. Lifetime variables may include data corresponding to total values associated with an entity over a lifetime or, in the case of electronically-stored data, the lifetime of the stored data for one or more data elements, or a rolling predetermined window of time that can encapsulate all data equally (e.g., five year rolling window, etc.). Examples of lifetime variables may include a total number of tax returns filed by a taxpayer over the entity and/or stored data lifetime, a total number of tax returns filed by a tax preparer over the entity and/or stored data lifetime, a total number of tax returns having a particular type of tax deduction over the entity lifetime and/or stored data lifetime, etc.

Figure 14:
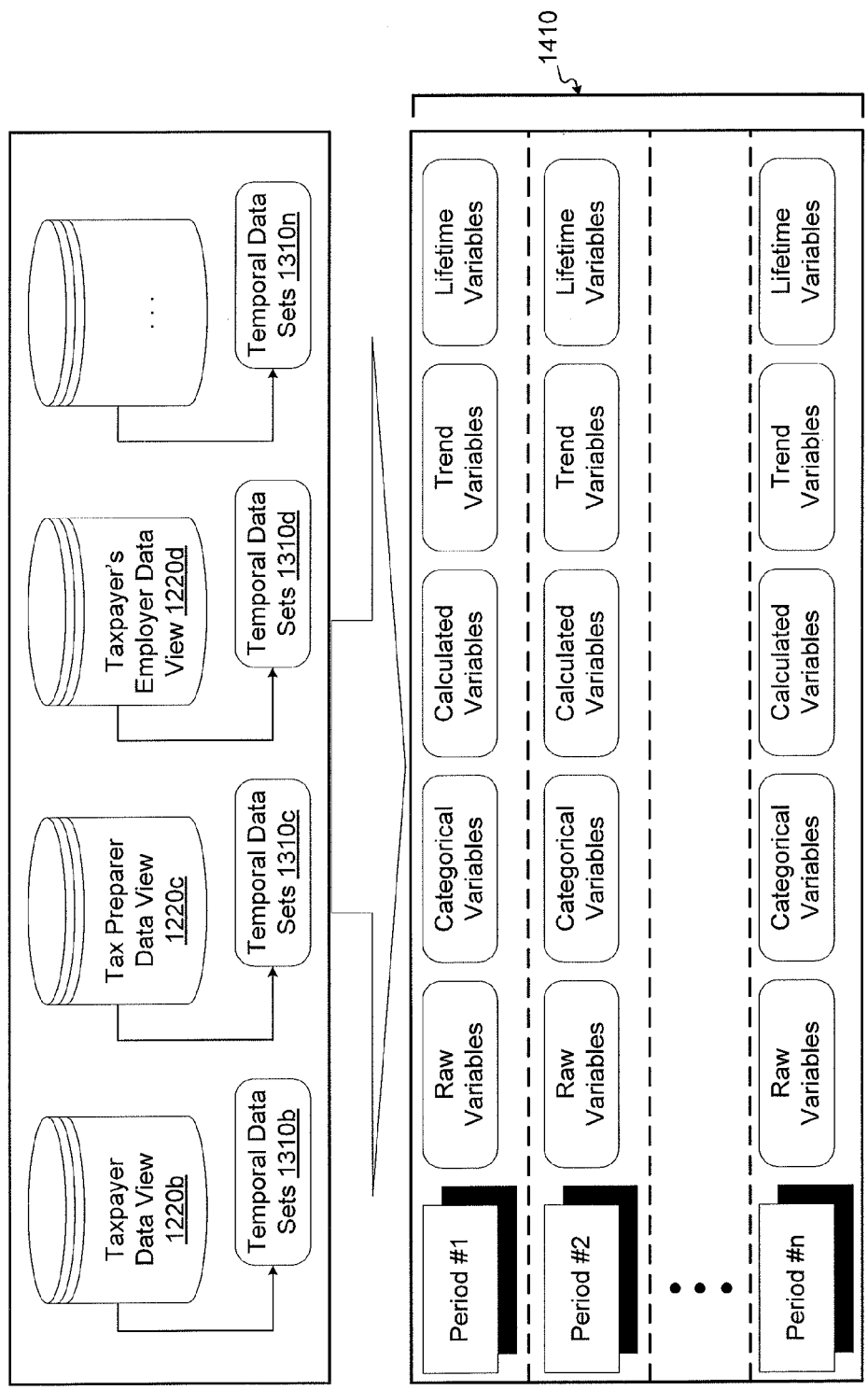
FIG. 14 illustrates an exemplary data structure for a system of threat assessment, consistent with certain exemplary embodiments.

FIG. 14 illustrates one exemplary embodiment of integrating transformed variables with temporally-segmented data sets 1310, consistent with certain disclosed embodiments. In FIG. 14, for each time period (i.e., Period #1, Period #2, . . . , Period #n), the temporally-segmented data sets 1310 associated with each entity-centric data view 1220 are integrated with one or more transformed variables 1410, including one or more raw variables, categorical variables, calculated variables, trend variables, and lifetime variables for each time period such that each entity has one record per time period. For example, the temporally-segmented data sets 1310b are integrated with the one or more transformed variables for each time period, the temporally-segmented data sets 1310c are integrated with the one or more transformed variables for each time period, the temporally-segmented data sets 1310d are integrated with the one or more transformed variables for each time period, and so on. The resulting pre-processed data is then available for further processing and/or combination with real-time data.

Referring again to FIG. 10, threat detection engine 210 outputs the pre-processed data in combination with integrated real-time data (1030). In some embodiments, the combined data may be output and/or stored by database 305 for subsequent use by one or more other processes. In other embodiments, the combined data may be output to one or more I/O devices, including, for example, displays, printers, etc. In still other embodiments, the combined data may be output to one or more other computing devices, such as, for example, handheld electronic devices, mobile telephones, PDAs, etc. In some embodiments, the real-time data may be transformed as a result of its integration with the pre-processed data.

Figure 15:
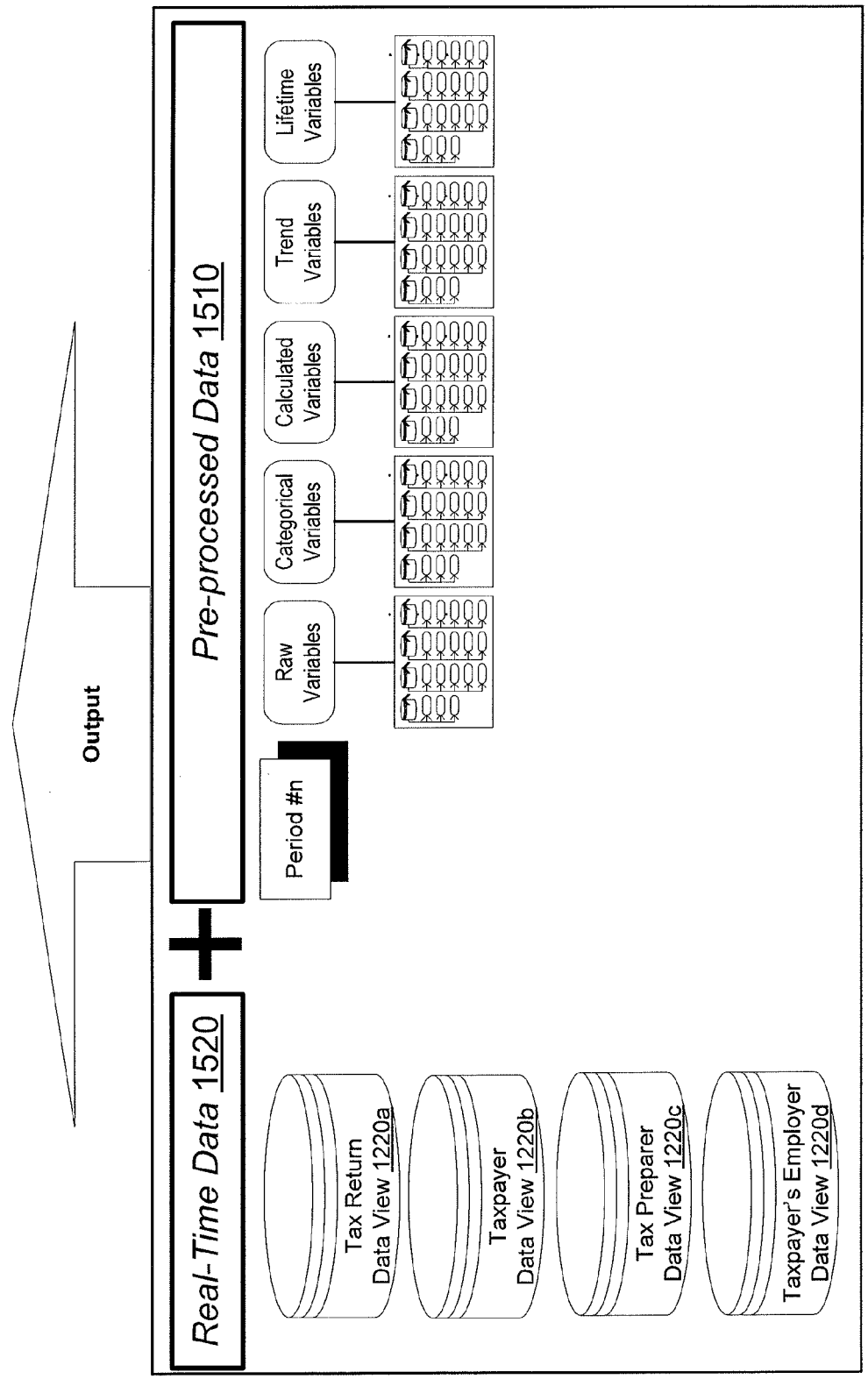
FIG. 15 illustrates an exemplary system for data creation for a method of threat assessment, consistent with certain exemplary embodiments.

FIG. 15 illustrates one exemplary embodiment of outputting the pre-processed data 1510 in combination with integrated real-time data 1520, consistent with certain disclosed embodiments. In FIG. 15, the pre-processed data 1510, consisting of temporally-segmented data sets which are integrated with one or more transformed variables, are output in connection with integrated real-time data 1520. Again, referring to the tax example, integrated real-time data 1520 may include current year tax data that may, in the disclosed implementations, be realized by threat detection engine 210 as data views 1220 when a tax return (e.g., tax return data view 1220a) associated with a taxpayer (e.g., taxpayer data view 1220b) is prepared and submitted by a tax preparer (e.g., tax preparer data view 1220c), that further identifies the taxpayer's employer (e.g., taxpayer's employer data view 1220d).

The embodiments disclosed herein may also include adaptive or recursive learning and improvement. For example, the disclosed systems and methods may capture false and/or true positives, and store the captured data. The captured and stored data may be used to refresh patterns, rebuild patterns, retire patterns, and/or create new patterns.

Refreshing patterns may include updating weights and/or coefficients used in creating patterns. Rebuilding patterns may include reassessing attributes associated with a pattern. Retiring patterns may include archiving patterns associated with threats that are deemed to no longer exist or to be below a threshold of occurrence probability. Creating new patterns may include detecting new threats or identifying behavior that may be indicative of a new type of threat, and then creating new patterns in response.

The disclosed embodiments may be used, for example, to determine if there is a potential for risk of a potential and/or possible security breach, such as, for example, risk of information disclosure or leakage, risk of theft, financial risk, attrition risk, etc. For example, the disclosed embodiments may be used to analyze log data to determine if a pattern of unusual and/or unexpected logins or data accesses is indicative of a theft of data.

While certain features and embodiments of the disclosure have been described, other embodiments of the disclosure will be apparent to those skilled in the art from consideration of the specification and practice of the embodiments of the disclosure disclosed herein. Furthermore, although aspects of embodiments of the present disclosure have been described as being associated with data stored in memory and other storage mediums, one skilled in the art will appreciate that these aspects can also be stored on or read from other types of computer-readable media, such as secondary storage devices, like hard disks, floppy disks, or a CD-ROM, or other forms of RAM or ROM. Further, the steps of the disclosed methods may be modified in various ways, including by reordering steps and/or inserting or deleting steps, without departing from the principles of the disclosure.

Moreover, one of ordinary skill would appreciate that the disclosure may be used in other fields in addition to insider threats, such as, for example, security threats, visa/immigration applications, etc.

It is intended, therefore, that the specification and examples be considered as exemplary only, with a true scope and spirit of the disclosure being indicated by the following claims and their full scope of equivalents.

What is claimed is:

1. A computer-implemented method, performed by at least one processor, for performing threat assessments, comprising:
   identifying, by the at least one processor, a first security breach at a first company;
   determining, by the at least one processor, after identifying the first security breach, one or more first actions associated with the first security breach, the one or more first actions including actions taken following the first security breach and actions taken prior to the first security breach;
   identifying, by the at least one processor, a first possible security breach at the first company;
   determining, by the at least one processor, contemporaneously with the identification of the first possible security breach, one or more second actions associated with the first possible security breach;
   generating, by the at least one processor, one or more patterns of behavior associated with the first company and corresponding to the one or more first actions and the one or more second actions;
   storing, by the at least one processor, the one or more patterns of behavior in a pattern repository;
   comparing, by the at least one processor, at least one of the one or more patterns with one or more standardized log files for the first company to identify one or more first log entries related to the at least one of the one or more patterns of behavior and corresponding to the one or more first actions and the one or more second actions, the one or more first log entries being identified based on a threshold of similarity between the at least one of the one or more patterns of behavior and the one or more standardized log files for the first company;
   notifying, by the at least one processor and based on the one or more identified first log entries, the first company of the first possible security breach at the first company;
   performing, by the at least one processor and the first company and based on the notification, preventative action relating to the first possible security breach;
   receiving, by the at least one processor, feedback from the first company, the feedback including a measure of success relating to the at least one of the one or more patterns of behavior and the one or more identified first log entries;
   updating, by the at least one processor and based on the received feedback, the at least one of the one or more identified patterns of behavior;
   comparing, by the at least one processor, at least one of the updated patterns of behavior with one or more standardized log files for a second company to identify log entries of the second company relating to a second possible security breach at the second company; and
   notifying, by the at least one processor and based on the one or more identified first log entries of the second company, the second company of a second possible security breach at the second company.

2. The computer-implemented method of claim 1, further including:
   notifying, when one or more log entries of the first company are identified, the first company of the results of the comparing of the at least one of the updated patterns of behavior with the one or more standardized log files for the second company.

3. The computer-implemented method of claim 1, further including:
notifying, when one or more log entries of the second company are identified, the second company of the results of the comparing of the at least one of the updated patterns of behavior with the one or more standardized log files for the second company.

4. The computer-implemented method of claim 1, further including:
processing, for the first company, log files of disparate devices of the first company to generate a standardized log file; and
combining the log files to generate a unified log file for the first company.

5. The computer-implemented method of claim 1, further including:
processing, for the second company, log files from disparate device of the second company to generate company standardized log files; and
combining, for each of the one or more second companies, the company standardized log files to generate a company unified log file.

6. The computer-implemented method of claim 1, wherein generating the one or more patterns includes:
identifying one or more actions or series of actions corresponding to the security breach, wherein the actions include at least one of downloading data, storing data, logging onto a computer network, entering a secured location, and using a device associated with the first company.

7. The computer-implemented method of claim 1, further including:
collecting patterns of behavior from one or more third party sources; and
storing the collected patterns of behavior in the pattern repository.

8. A non-transitory computer-readable medium storing a computer-executable program which, when executed by at least one processor, performs a method for performing threat assessments, comprising:
identifying, by the at least one processor, a first security breach at a first company;
determining, by the at least one processor, after identifying the first security breach, one or more first actions associated with the first security breach, the one or more first actions including actions taken following the first security breach and actions taken prior to the first security breach;
identifying, by the at least one processor, a first possible security breach at the first company;
determining, by the at least one processor, contemporaneously with the identification of the first possible security breach, one or more second actions associated with the first possible security breach;
generating, by the at least one processor, one or more patterns of behavior associated with the first company and corresponding to the one or more first actions and the one or more second actions;
storing, by the at least one processor, the one or more patterns of behavior in a pattern repository;
comparing, by the at least one processor, at least one of the one or more patterns with one or more standardized log files for the first company to identify one or more first log entries related to the at least one of the one or more patterns of behavior and corresponding to the one or more first actions and the one or more second actions, the one or more first log entries being identified based on a threshold of similarity between the at least one of the one or more patterns of behavior and the one or more standardized log files for the first company;
notifying, by the at least one processor and based on the one or more identified first log entries, the first company of the first possible security breach at the first company;
performing, by the at least one processor and the first company and based on the notification, preventative action relating to the first possible security breach;
receiving, by the at least one processor, feedback from the first company, the feedback including a measure of success relating to the at least one of the one or more patterns of behavior and the one or more identified first log entries;
updating, by the at least one processor and based on the received feedback, the at least one of the one or more identified patterns of behavior;
comparing, by the at least one processor, at least one of the updated patterns of behavior with one or more standardized log files for a second company to identify log entries of the second company relating to a second possible security breach at the second company; and
notifying, by the at least one processor and based on the one or more identified first log entries of the second company, the second company of a second possible security breach at the second company.

9. The non-transitory computer-readable medium of claim 8, further including:
notifying, when one or more log entries of the first company are identified, the first company of the results of the comparing of the at least one of the updated patterns of behavior with the one or more standardized log files for the second company.

10. The non-transitory computer-readable medium of claim 8, further including:
notifying, when one or more log entries of the second company are identified, the second company of the results of the comparing of the at least one of the updated patterns of behavior with the one or more standardized log files for the second company.

11. The non-transitory computer-readable recording medium of claim 8, further including:
processing, for the first company, log files of disparate devices of the first company to generate a standardized log file; and
combining the log files to generate a unified log file for the first company.

12. The non-transitory computer-readable recording medium of claim 8, further including:
processing, for each of the one or more second companies, company log files to generate company standardized log files; and
combining, for each of the one or more second companies, the company standardized log files to generate a company unified log file.

13. The non-transitory computer-readable recording medium of claim 8, wherein generating the one or more patterns includes:
identifying one or more actions or series of actions corresponding to the security breach, wherein the actions include at least one of downloading data, storing data, logging onto a computer network, entering a secured location, and using a device associated with the first company.

14. The non-transitory computer-readable recording medium of claim 8, further including:
   collecting patterns of behavior from one or more third party sources; and
   storing the collected patterns of behavior in the pattern repository.

15. A system for identifying patterns of actions for performing threat assessments, the system comprising:
   at least one memory to store data and instructions; and
   at least one processor configured to access the at least one memory and, when executing the instructions to:
   identify, by the at least one processor, a first security breach at a first company;
   determine, by the at least one processor, after identifying the first security breach, one or more first actions associated with the first security breach, the one or more first actions including actions taken following the first security breach and actions taken prior to the first security breach;
   identify, by the at least one processor, a first possible security breach at a first company;
   determine, by the at least one processor, contemporaneously with the identification of the first possible security breach, one or more second actions associated with the first possible security breach;
   generate, by the at least one processor, one or more patterns of behavior associated with the first company and corresponding to the one or more first actions and the one or more second actions;
   store, by the at least one processor, the one or more patterns of behavior in a pattern repository;
   compare, by the at least one processor, at least one of the one or more patterns with one or more standardized log files for the first company to identify one or more first log entries related to the at least one of the one or more patterns of behavior and corresponding to the one or more first actions and the one or more second actions, the one or more first log entries being identified based on a threshold of similarity between the at least one of the one or more patterns and the one or more standardized log files for the first company;
   notify, by the at least one processor and based on the one or more identified first log entries, the first company of the first possible security breach at the first company;
   perform, by the at least one processor and the first company and based on the notification, preventative action relating to the first possible security breach;
   receive, by the at least one processor, feedback from the first company, the feedback including a measure of success relating to the at least one of the one or more patterns of behavior and the one or more identified first log entries;
   update, by the at least one processor and based on the received feedback, the at least one of the one or more identified patterns of behavior;
   compare, by the at least one processor, at least one of the updated patterns with one or more standardized log files for a second company to identify log entries of the second company relating to a second possible security breach at the second company; and
   notify, by the at least one processor and based on the one or more identified first log entries of the second company, the second company of a second possible security breach at the second company.

16. The system of claim 15, wherein the at least one processor is further configured to:
   notify, when one or more log entries of the first company are identified, the first company of the results of the comparing of the at least one of the updated patterns of behavior with the one or more standardized log files for the second company.

17. The system of claim 15, wherein the at least one processor is further configured to:
   notify, when one or more log entries of the second company are identified, the second company of the results of the comparing of the at least one of the updated patterns of behavior with the one or more standardized log files for the second company.

18. The system of claim 15, wherein the at least one processor is further configured to:
   process, for the first company, log files of disparate devices of the first company to generate a standardized log file; and
   combine the log files to generate a unified log file for the first company.

19. The system of claim 15, wherein the at least one processor is further configured to:
   process, for each of the one or more second companies, company log files to generate company standardized log files; and
   combine, for each of the one or more second companies, the company standardized log files to generate a company unified log file.

20. The system of claim 15, wherein when the at least one processor is configured to generate the one or more patterns, the at least one processor is further configured to:
   identify one or more actions or series of actions corresponding to the security breach, wherein the actions include at least one of downloading data, storing data, logging onto a computer network, entering a secured location, and using a device associated with the first company.

21. The system of claim 15, wherein the at least one processor is further configured to:
   collect patterns of behavior from one or more third party sources; and
   store the collected patterns of behavior in the pattern repository.

* * * * *